United States Patent [19]
Newman

[11] Patent Number: 6,149,019
[45] Date of Patent: Nov. 21, 2000

[54] MODULAR LIBRARY SYSTEM (COMPACT DISC HOUSING UNIT)

[75] Inventor: Mitchell Allen Newman, Novato, Calif.

[73] Assignee: Mitchell A. Newman, Novato, Calif.

[21] Appl. No.: 09/459,942

[22] Filed: Dec. 14, 1999

Related U.S. Application Data

[63] Continuation-in-part of application No. 09/013,613, Jan. 26, 1998, abandoned.

[51] Int. Cl.$^7$ .................................. A47F 7/00; A47F 5/00
[52] U.S. Cl. ........................... 211/40; 211/163; 312/9.46; 312/9.47
[58] Field of Search .................................. 211/40, 41.12, 211/163; 312/9.9, 9.46, 9.47, 133, 322; D6/407

Primary Examiner—Robert W. Gibson, Jr.
Attorney, Agent, or Firm—Melissa Newman

[57] ABSTRACT

A Modular Library System, compact disc holder comprises a main housing unit with a lower plate, an upper plate, a pair of opposing side walls, and a rear wall. In addition, the main housing includes an inner retractable plate. Mounted on the inner retractable plate is an inner unit, with a turntable in between, allowing for 180 degree rotation when the inner retractable plate is fully extended. Accordingly, the retractable inner unit is comprised of a lower plate, an upper plate, a pair of opposing side walls, and two inner walls parallel to the opposing side walls. Housed within the inner unit are six individual smaller units, which have a series of elongated ribs, providing storage slots for CD's. Each of these six individual smaller units can be removed and relocated as desired. The dimensions of the compact disc housing unit were designed to fit into the bottom of most stereo rack systems, although it may stand alone, as well.

4 Claims, 10 Drawing Sheets

MODULAR LIBRARY SYSTEM (COMPACT DISC HOUSING UNIT)

RELATED APPLICATION

This application is a continuation-in-part of U.S. patent application Ser. No. 09/013,613, filed Jan. 26, 1998, now abandoned.

BACKGROUND OF THE INVENTION

The present invention relates to a compact disc housing unit. More particularly, the present invention relates to a plurality of individual compact disc units that can be housed together in a larger stationary unit, or removed individually for relocation. Ideally, the components of the compact disc housing unit can be manufactured by standard molding operations; injection molding or similar means. The compact disc housing unit was designed specifically with the dimensions to fit into the bottom of most stereo rack system and home entertainment systems, although it may stand alone, or be stacked as well. CD's, musical, or computer software in design can be rested in the compact disc housing unit.

A variety of compact disc holders are commercially available. There are compact disc holders on the market that are functional and/or expendable, but these units often lack the characteristics important to the consumer. Aesthetic appearance, easy accessibility, space efficiency; defined as both the maximum CD storage capacity per inch and actual physical dimensions, easy viewing, cost, and portability are all important considerations. Typically, most compact disc holders fail to possess more than a couple of these properties.

The prior art includes various patents related to the storage of containers such as U.S. Pat. No. 5,765,697, which shows a compact disc organizer that, may be mounted on a turntable, and is stackable. It can also assume an adjacent, side by side relationship. Another patent of note is U.S. Pat. No. 5,749,477 which allows for a range of configurations that can be easily assembled by the customers, and is adaptable, housing VHS tapes and CDs both.

Other patents of interest, including similar structures, include U.S. Pat Nos. 3,467,455, 3,736,365; 5,584,391; 57,303003; and 57,917,488. None of the foregoing patents disclose anticipatory subject matter which would affect the patentability of this invention.

SUMMARY OF THE INVENTION

The present invention is designed to overcome the characteristics found deficient in the prior discussed art above. It is an object of this invention to provide a compact disc housing unit which provides easy accessibility to compact discs while utilizing a space efficient design.

It is a further object of this invention to provide a compact disc housing unit, which allows the compact disc's stored within to be easily viewed.

It it yet another object of the invention to provide a compact disc housing unit, which has an aesthetically pleasing appearance.

It is a further object of the invention to provide a compact disc housing unit, which is relatively inexpensive in cost, including simple components, which can be manufactured easily by usual molding operations; injection molding or similar means.

In accordance with the illustrative embodiment, demonstrating features and advantages of the present invention, comprised of the main housing unit, the inner unit, and six individual smaller units, two drawer slides (referred hereafter as support members), and a turntable. Accordingly, the main housing unit is comprised of a lower plate, an upper plate, a pair of opposing side walls, a rear wall, an inner retractable wall, two support members, and a turntable. Each support member is comprised of two pieces, each with an annular projection along its edges, which when fitted together encloses the one within the other. In addition a multiple of steel balls are housed within the annular grove, allowing for a sliding motion. The larger, enclosing piece of the support member is secured by mounting means to the inner side of the two opposing side walls, where the side walls meet the lower plate, via a multiple of apertures at equal intervals. The smaller, enclosed piece of the support member is secured by mounting means to the inner retractable plate via a multiple of apertures at equal intervals. On top of the inner retractable plate is the bottom dish of a turntable, which when coupled with its upper portion allows the inner unit full rotation. The bottom dish is disposed with a central projecting post for rotatably fitting with the hollow post of the upper portion of the turntable. The bottom dish is secured to the inner retractable plate at equal radial length by mounting means. The upper dish is secured to the inner unit at equal radial length by mounting means. In addition, multiple short bosses are disposed on the surface of the inner upper face of the bottom dish. The inner bottom face of the upper dish is formed with a corresponding annular groove whereby steel balls can be disposed therebetween, permitting the inner unit to smoothly rotate relative to the bottom dish.

Accordingly, the inner unit is comprised of a lower plate, an upper plate, a pair of opposing side walls, and two inner walls parallel to the opposing side walls. Each of six individual smaller units are comprised of a lower plate, an upper plate, a rear wall, a pair of opposing side walls, and a drawer pull centered parallel to the lower and upper plates. On the inner side of each of the opposing side walls are a plurality of spaced parallel elongated ribs formed on said surface providing storage slots between adjacent pairs of the ribs for receiving CD's therebetween.

Designed to be space efficient, with the dimensions to fit in the bottom of most stereo rack systems, home entertainment systems, although it may stand alone or be stacked, the compact disc housing unit maximizes it's use of space by placing the six smaller units in a three, three relationship; back to back within the inner unit. The user gains access to the three smaller units, which appear hidden, by drawing the inner retractable plate to full extension, and rotating the turntable 180 degrees.

BRIEF DESCRIPTION OF DRAWINGS

The above and other objects and advantages of the present invention may be more clearly seen when viewed in conjunction with the accompanying drawings wherin.

DETAILED DESCRIPTION OF THE PREFERRED EMBODIMENTS

Figure 1:
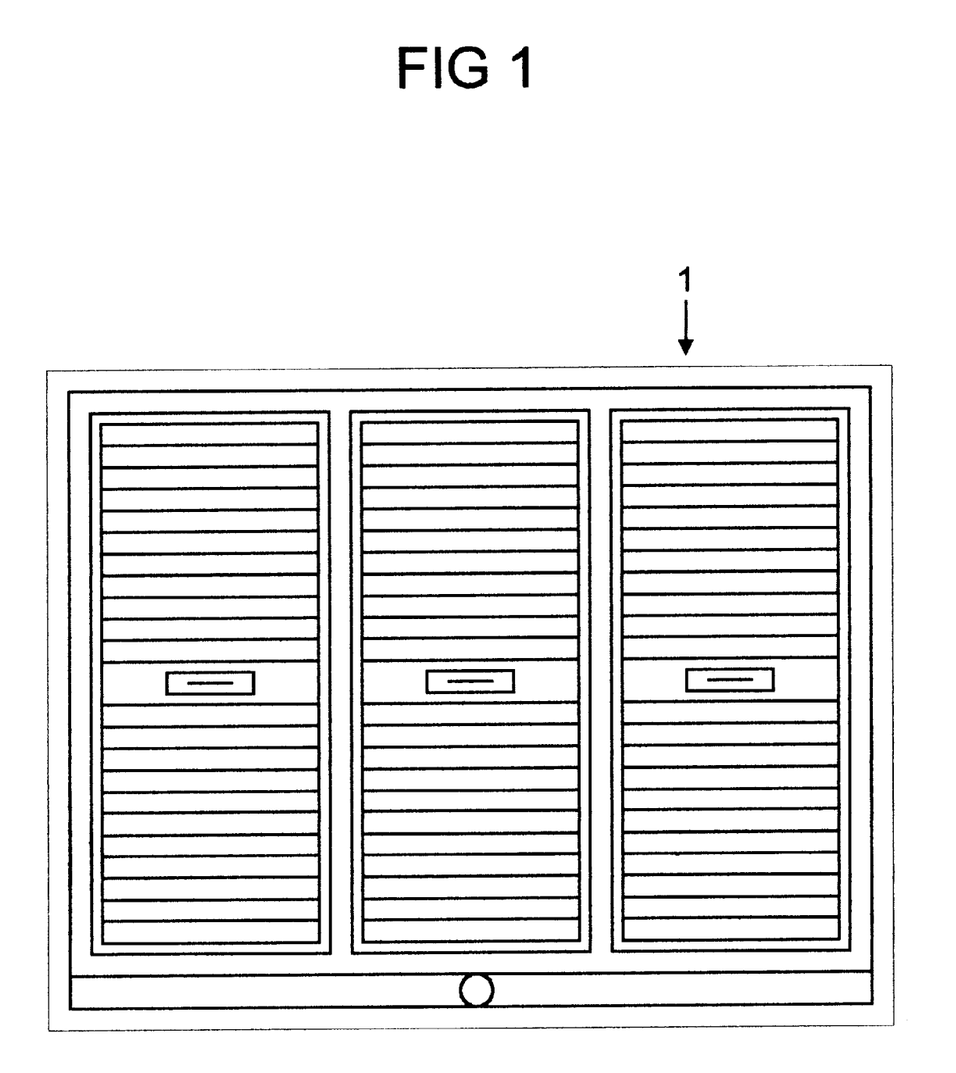
FIG. 1 is a perspective assembled view of a compact disc housing unit comprising the present invention.
Figure 2:
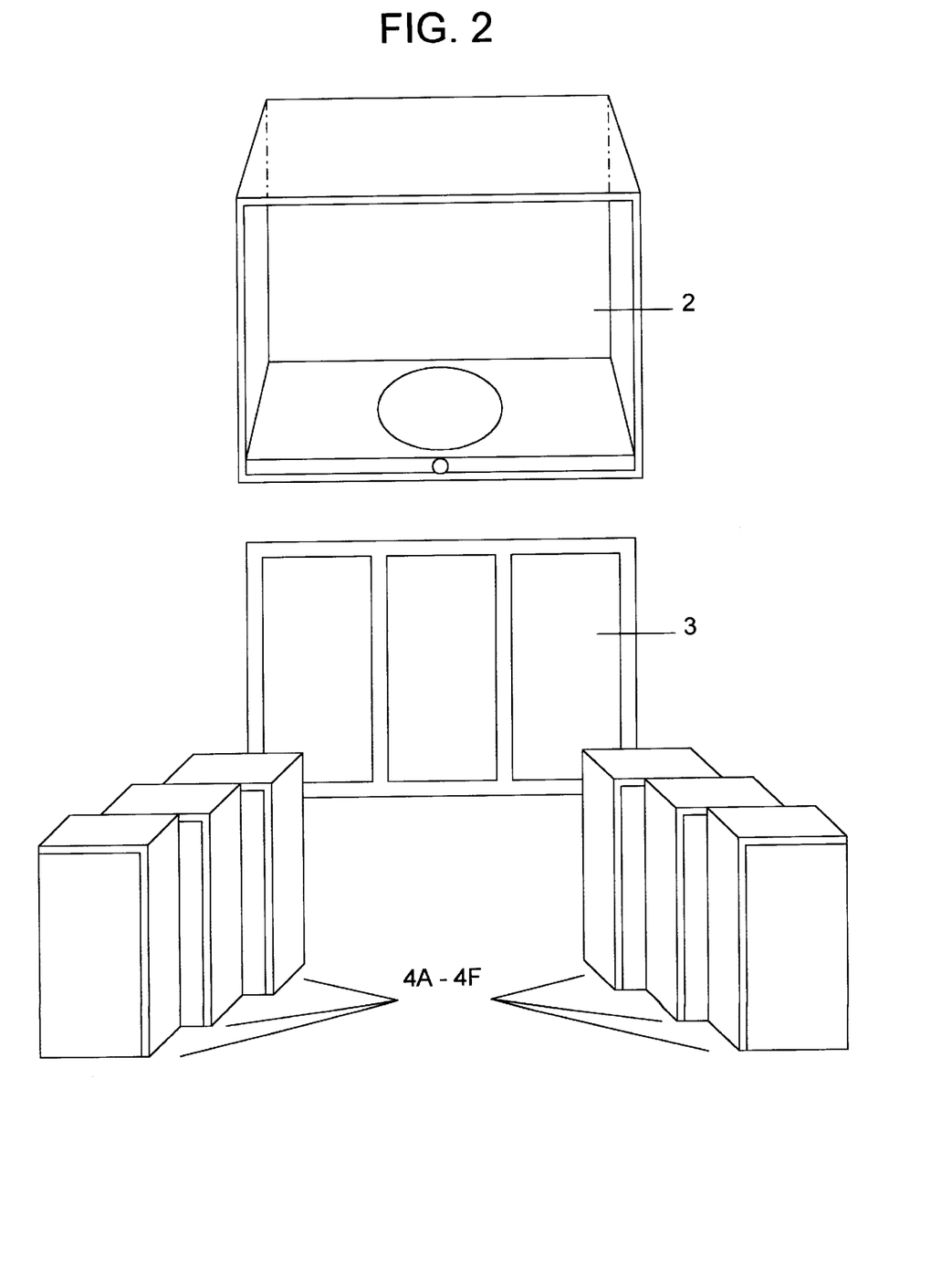
FIG. 2 is a perspective view of a compact disc housing unit comprising the present inventions individual components.

Referring now to the drawings, the present invention comprises a compact disc housing unit for storing CD's; computer software or musical in design, and is designated generally as 1, and is shown particularly in FIGS. 1–2. Please refer to FIG. 1, which shows a preferred embodiment of the present invention 1. The compact disc housing unit as shown in FIG. 2 essentially comprises a main housing unit 2, an inner unit 3, and six individual portable units 4a–4f.

Figure 3:
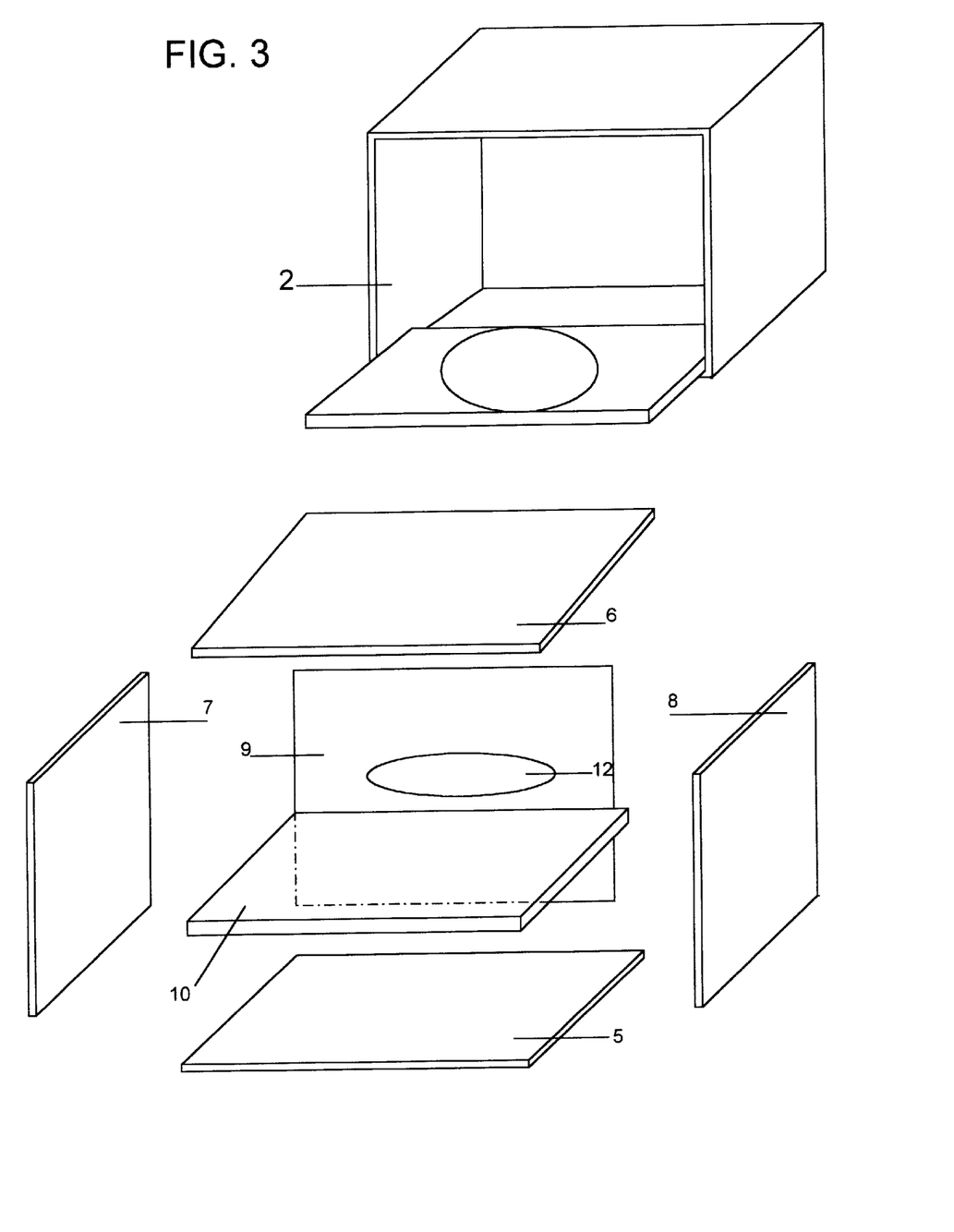
FIG. 3 is a perspective exploded view of the main housing unit of the present invention, less the support members.
Figure 4:
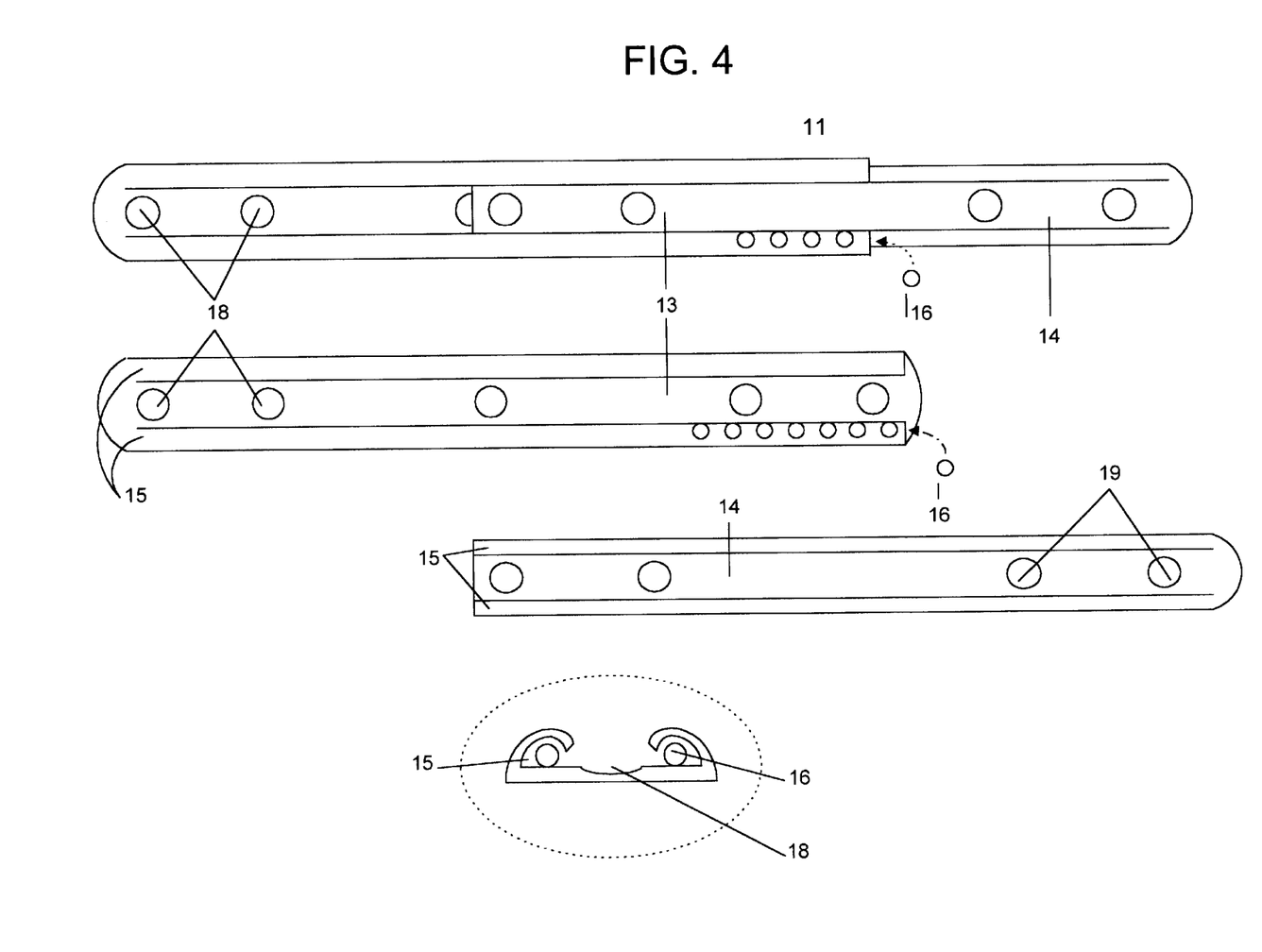
FIG. 4 is an exploded view of the support member which is mounted on the inner retractable plate within the main housing unit in one instance and on each of the opposing side walls of the main housing unit in the other instance.
Figure 5:
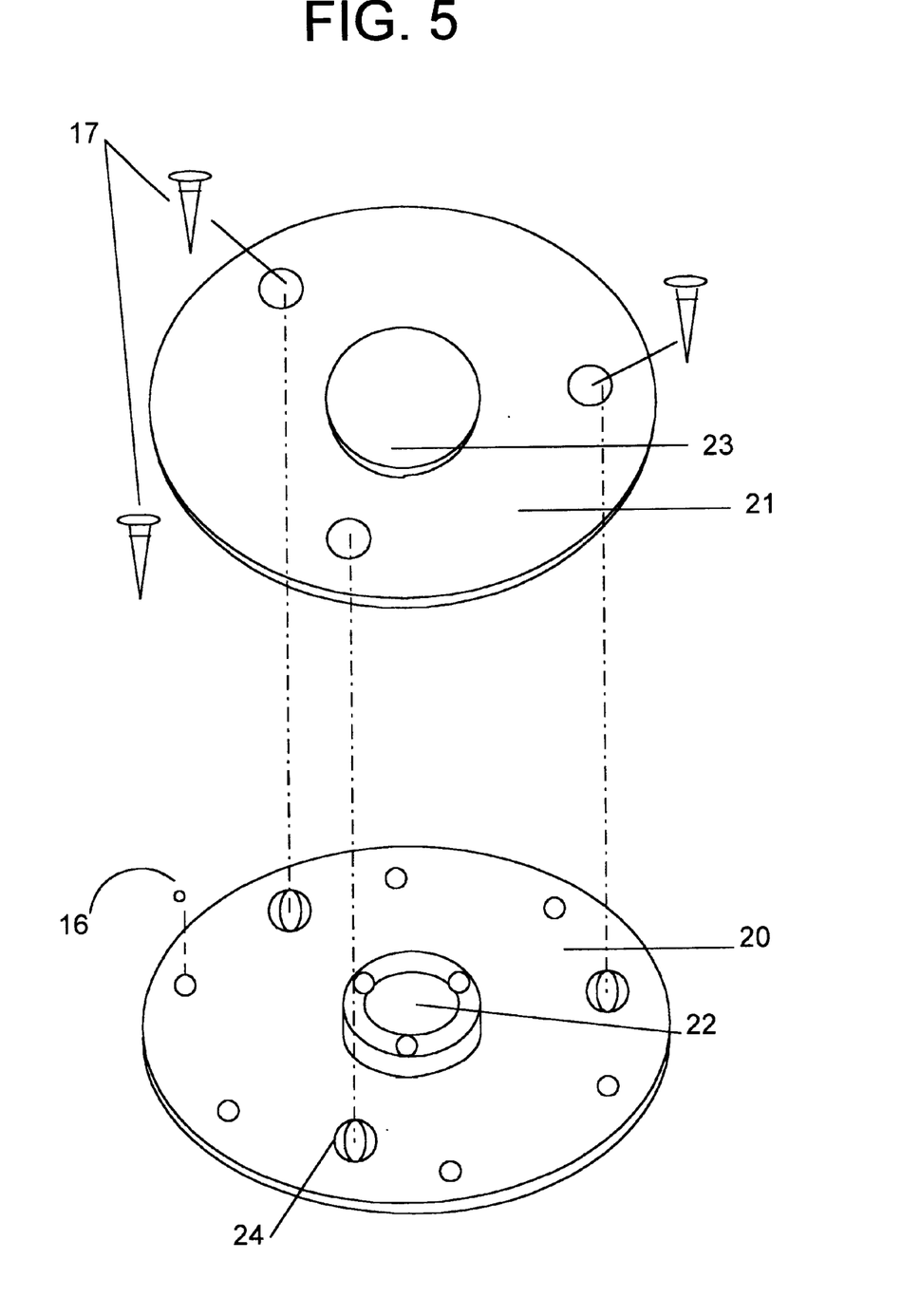
FIG. 5 is an upper exploded view of the turntable.
Figure 6:
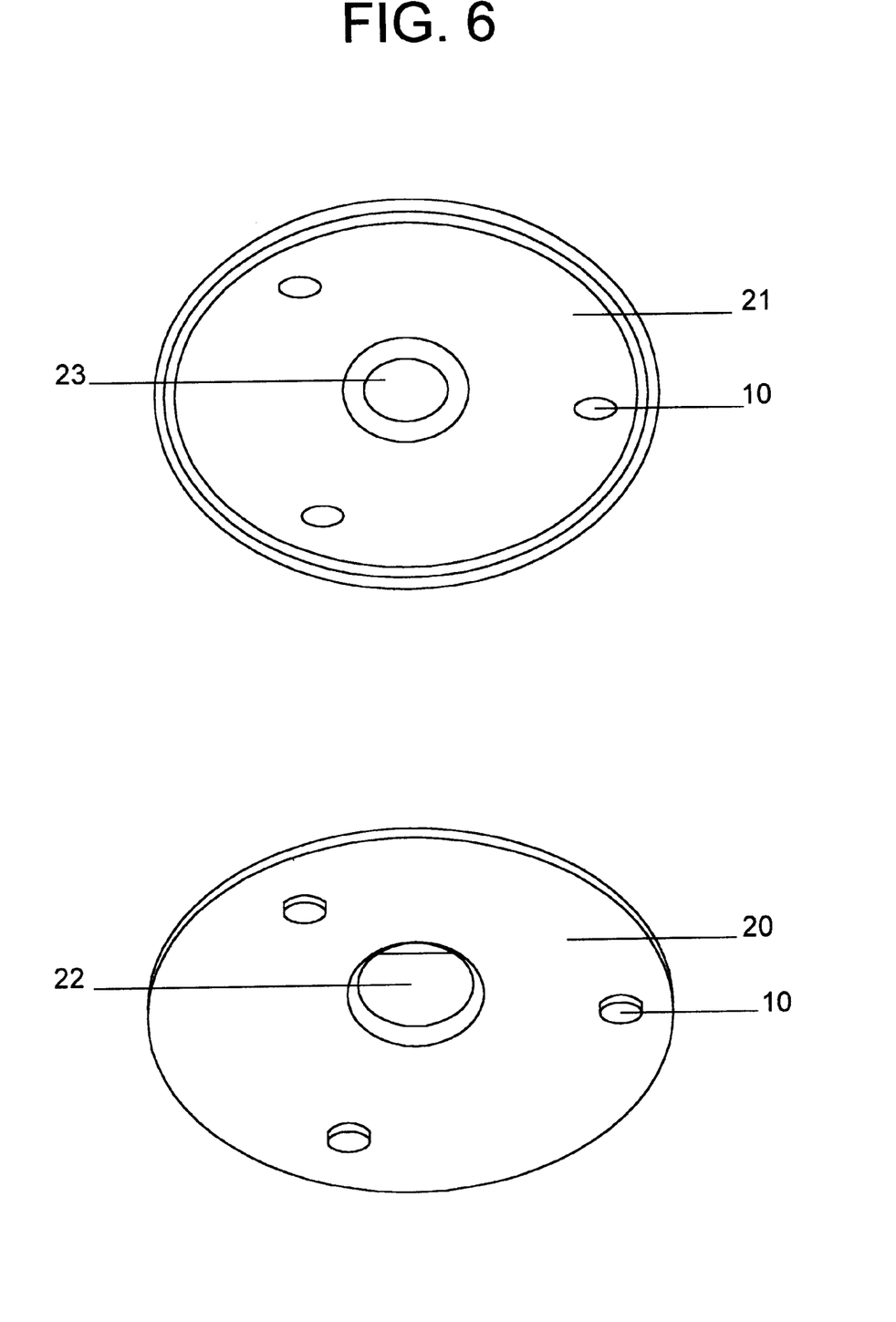
FIG. 6 is a lower exploded view of the turntable.

Please refer to FIG. 3. The main housing unit 2 is comprised of a lower plate 5, an upper plate 6, a pair of opposing side walls 7 and 8, and a rear wall 9, an inner retractable plate 10, two support members 11, and a turntable 12. As shown in FIG. 4, each support member 11 is comprised of two pieces 13 and 14, each with an annular projection 15 along its edges, which when fitted together encloses the one within the other. In addition a multiple of steel balls 16 are housed within the annular projection 15, allowing for a sliding motion. The larger, enclosing piece of the support member 13 is secured by mounting means 17 to the inner side of the two opposing side walls 7 and 8, where the side walls meet the lower plate 5, via a multiple of apertures at equal intervals 18. The smaller, enclosed piece of the support member 14 is secured by mounting means 17 to the inner retractable plate 10 via a multiple of apertures at equal intervals 19. On top of the inner retractable plate 10 is the bottom dish of a turntable 20, which when coupled with it's upper portion 21 allows the inner unit 3 full rotation. See FIGS. 5–6. The bottom dish 20 is disposed with a central projecting post 22 for rotatably fitting with the hollow post 23 of the upper portion 21 of the turntable. The bottom dish 20 is secured to the inner retractable plate 10 at equal radial length by mounting means 17. The upper dish 17 is secured to the inner unit 3 by mounting means. In addition, multiple short bosses 24 are disposed on the surface of the inner upper face of the bottom dish 20. The inner bottom face of the upper dish 21 is formed with corresponding annular groove 25 whereby steel balls 16 can be disposed therebetween, permitting the inner unit 3 to smoothly rotate relative to the bottom dish 20.

Figure 7:
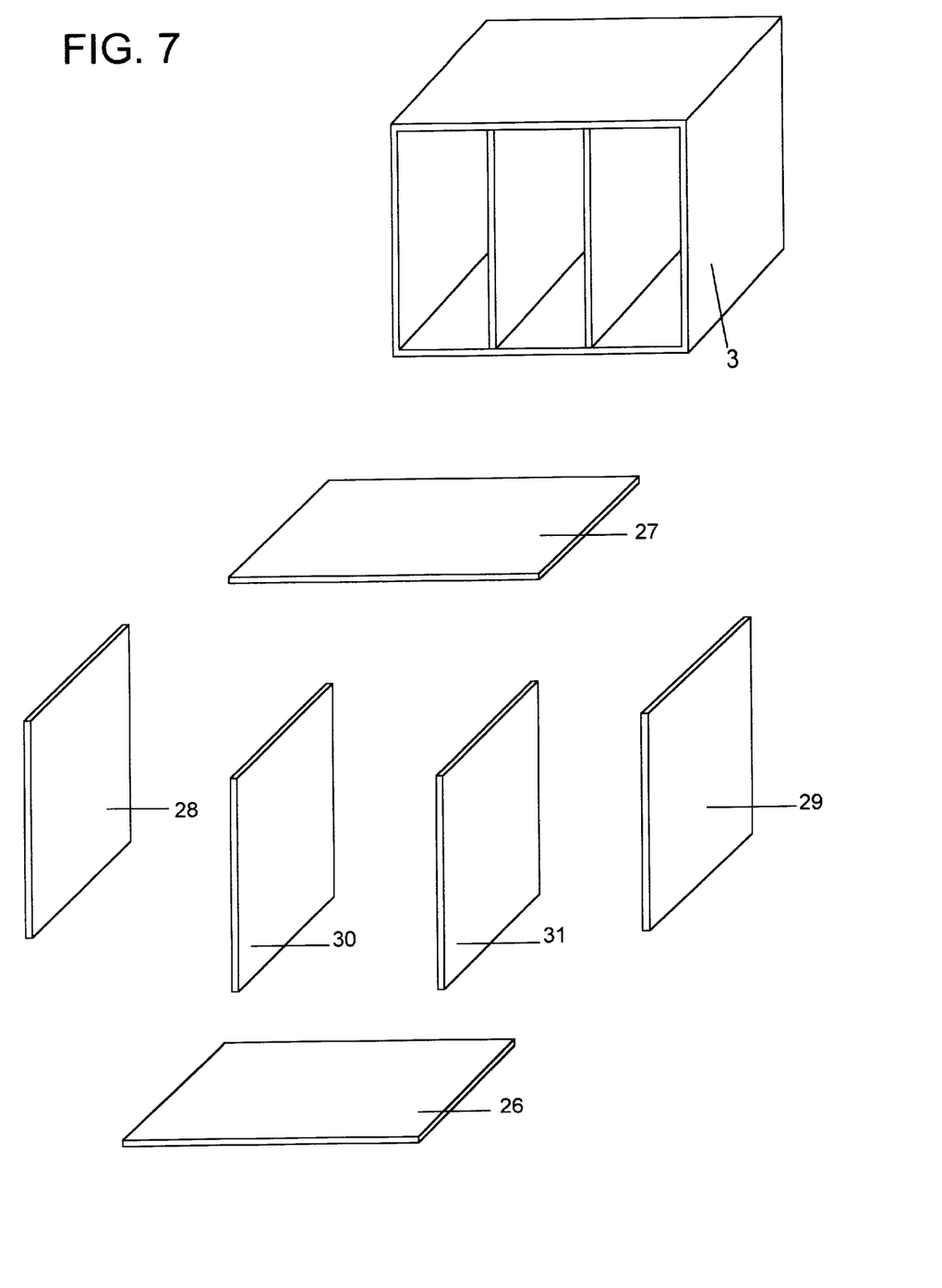
FIG. 7 is a perspective exploded view of the inner unit of the present invention.
Figure 8:
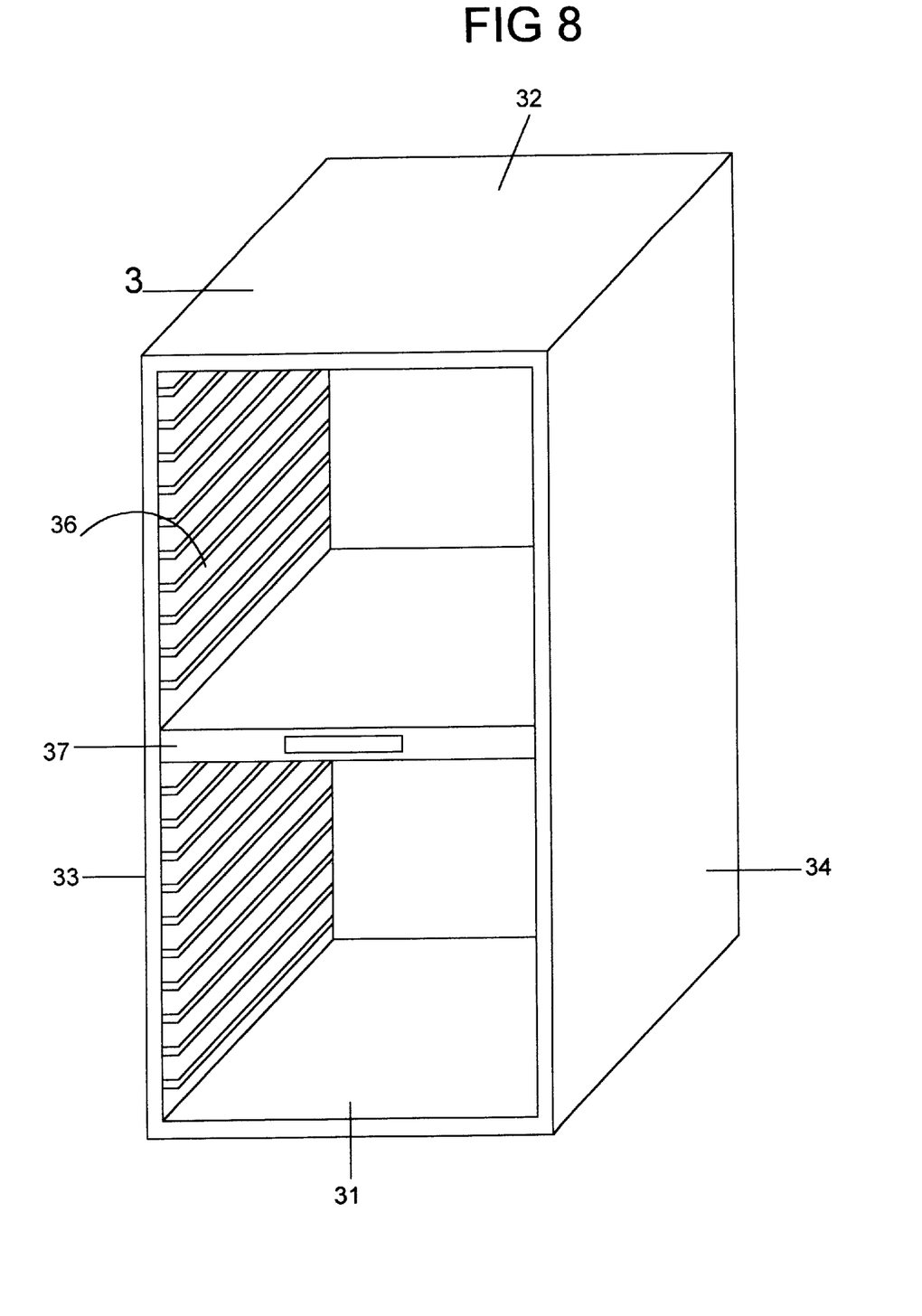
FIG. 8 is a perspective assembled view of the individual portable units.
Figure 9:
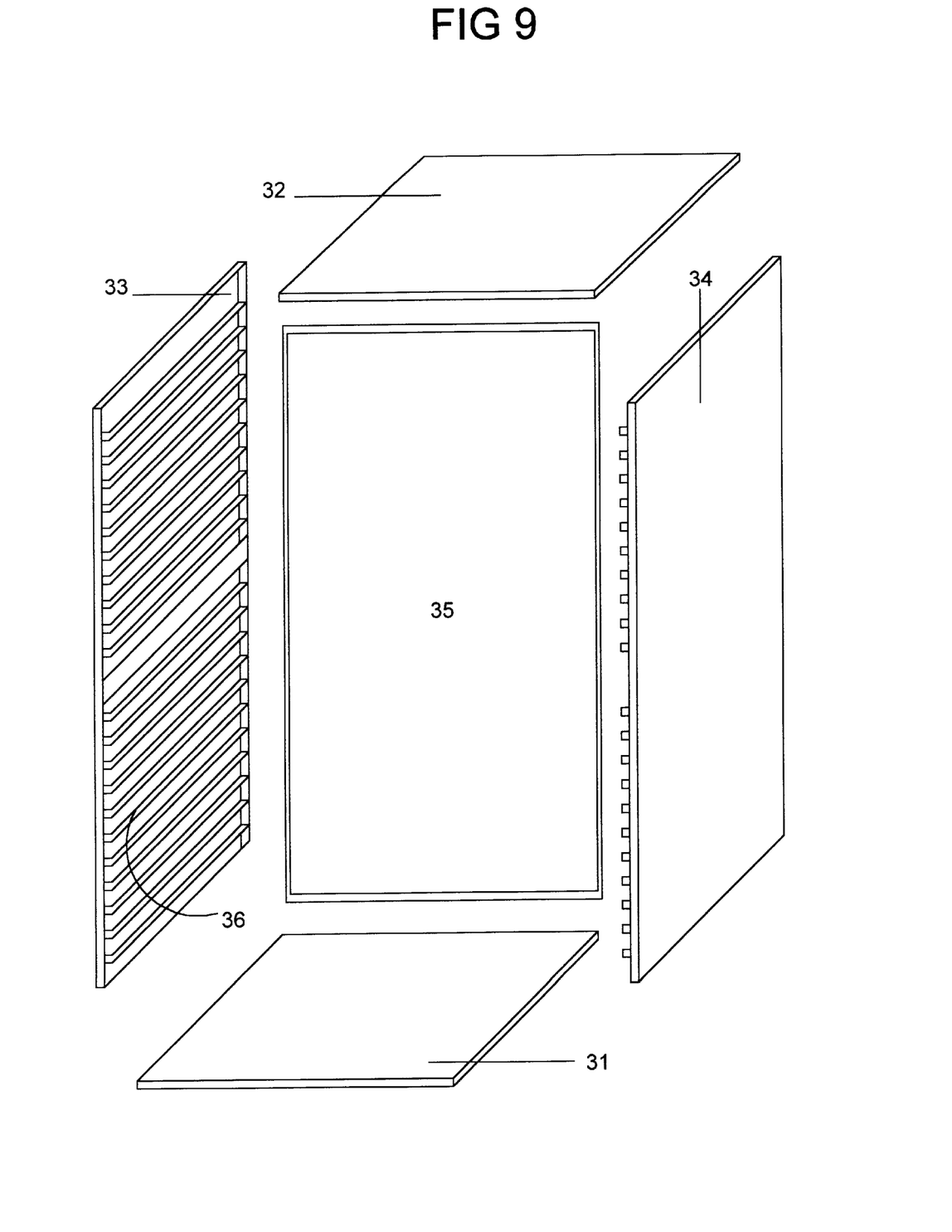
FIG. 9 is an exploded view of the individual portable units.
Figure 10:
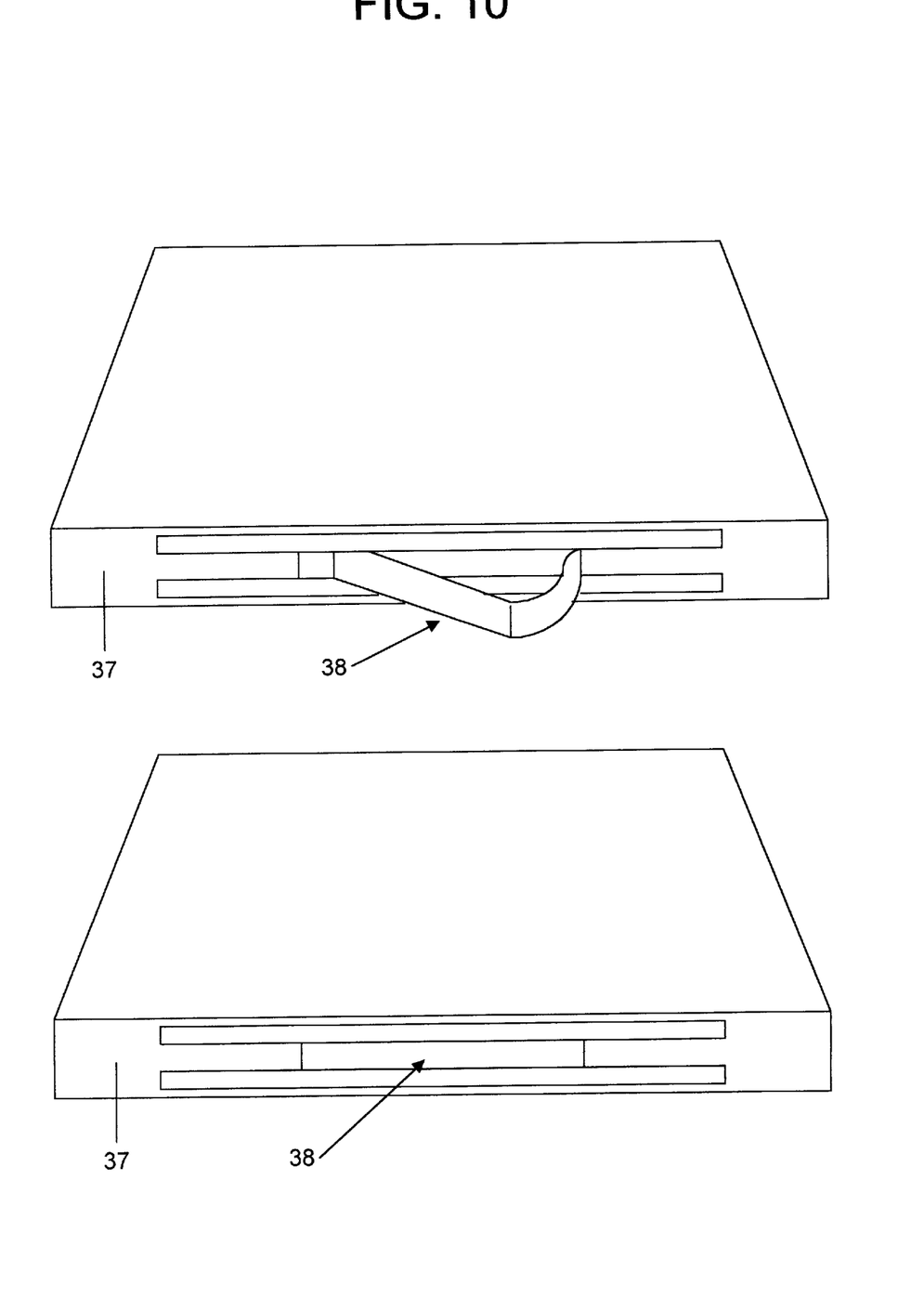
FIG. 10 is a perspective view of the handles, flushed and extended, attached to the individual portable units, as seen in FIG. 8.

FIG. 7 Accordingly, the inner unit 3 is comprised of a lower plate 26, an upper plate 27, a pair of opposing side walls 28 and 29, and two inner walls 30 and 31 parallel to the opposing side walls 28 and 29. See FIGS. 8–10. Each of the six individual smaller units 4a–4f are comprised of a lower plate 32, an upper plate 33, a pair of opposing side walls 34 and 35, a rear wall 36, and a drawer pull 37 centered parallel to the lower plate 32 and upper plate 33. On the inner side of each of the opposing side walls 34 and 35 are a plurality of spaced parallel elongated ribs for receiving CD's therebetween. The drawer pull 37 in each of the individual smaller units 4a–4f has a centrally located projection 38 which lies flush when resting, yet can be easily engaged to remove any of the individual smaller units 4a–4f from the compact disc housing unit 1 for portability.

Designed to be space efficient, with the dimensions to fit in the bottom of most stereo rack systems, and home entertainment systems, although it may stand alone or be stacked, the compact disc housing unit 1 maximizes it's use of space by placing the six smaller units 4a–4f in a three, three relationship; back to back within the inner unit 3. The user gains access to the three smaller units 4a–4f, which appear hidden, by drawing the inner retractable plate 10 to full extension, and rotating the turntable 20 180 degrees.

The compact disc housing unit 1 requires a simple mounting procedure prior to use. The compact disc housing unit 1 is secured in position by mounting means 39; still, it can be easily dismounted for relocation. In addition, the compact disc storage capacity can be increased by stacking one compact disc housing unit upon another.

It is to be understood that the above description and drawings are only used for illustrating one embodiment of the present invention, not intended to limit the scope thereof. Any variation and derivation from the above description and drawings should be included in the scope of the present invention.

What is claimed is:

1. A compact disc housing unit for storing CD's, musical or computer software in design, comprises:

a main housing unit, an inner unit, six individual smaller units, two support members, and a turntable; wherein the main housing unit comprises of a lower plate, an upper plate, a pair of opposing side walls, a rear wall, an inner retractable plate, two support members, each of which is comprised of two pieces having annular projections along their edges which when fitted together enclosed one within the other, such that a multiple of steel balls housed within said annular projection allow for a sliding motion between said two pieces, wherein a larger enclosing piece of the support member is mounted securely to the inner side of the two opposing side walls, where the side walls meet the lower plate via a multiple of equally spaced intervals, wherein a smaller enclosed piece of the support member is secured by mounting means to the inner retractable plate via a multiple of apertures, where on top of the inner retractable plate is a bottom dish of a turntable, disposed with a central projecting post which when coupled with a hollow post of the upper dish of the turntable allows the inner unit full rotation, where the upper dish of the turntable is secured to the inner unit by mounting means, multiple short bosses disposed on the upper face of the bottom dish, the bottom face of the upper dish being formed with a corresponding annular groove wherein steel balls can be disposed within said annular groove permitting the inner unit to smoothly rotate relative to the bottom dish; the inner unit comprising a lower plate, an upper plate, a pair of opposing side walls, and two inner walls parallel to the opposing side walls; in addition, each of the six individual smaller units positioned three by three back to back within the inner unit are comprised of a lower plate, an upper plate, a rear wall, a pair of opposing side walls, and a drawer pull located on each individual smaller unit parallel to and equal distance from the lower plate and upper plate; the inner side of each of the opposing side walls of said individual smaller units having a plurality of spaced parallel elongated ribs formed on said inner side providing storage slots between adjacent pairs of the ribs for receiving CD's therebetween.

2. A compact disc housing unit as claimed in claim 1 wherein its dimensions are designed such that it will fit into the bottom of most stereo rack systems, although it may stand alone, or be stacked as well.

3. A compact disc housing unit as claimed in claim 1 wherein each of the six individual smaller units housed in the inner unit are designed such that each individual smaller unit is portable and may be easily removed and transported by engaging the drawer pull located parallel to and equal distance from the lower and upper plate of the individual smaller units.

4. A compact disc housing unit as claimed in claim 1 wherein the inner unit is rotatable 180 degrees when the retractable plate is fully extended, allowing access to the three previously inaccessible individual smaller units.

* * * * *